Oct. 30, 1928.
H. C. WILCOX
1,689,468
BARREL, METHOD OF AND MACHINE FOR MAKING THE SAME
Filed Jan. 13, 1927  5 Sheets-Sheet 1
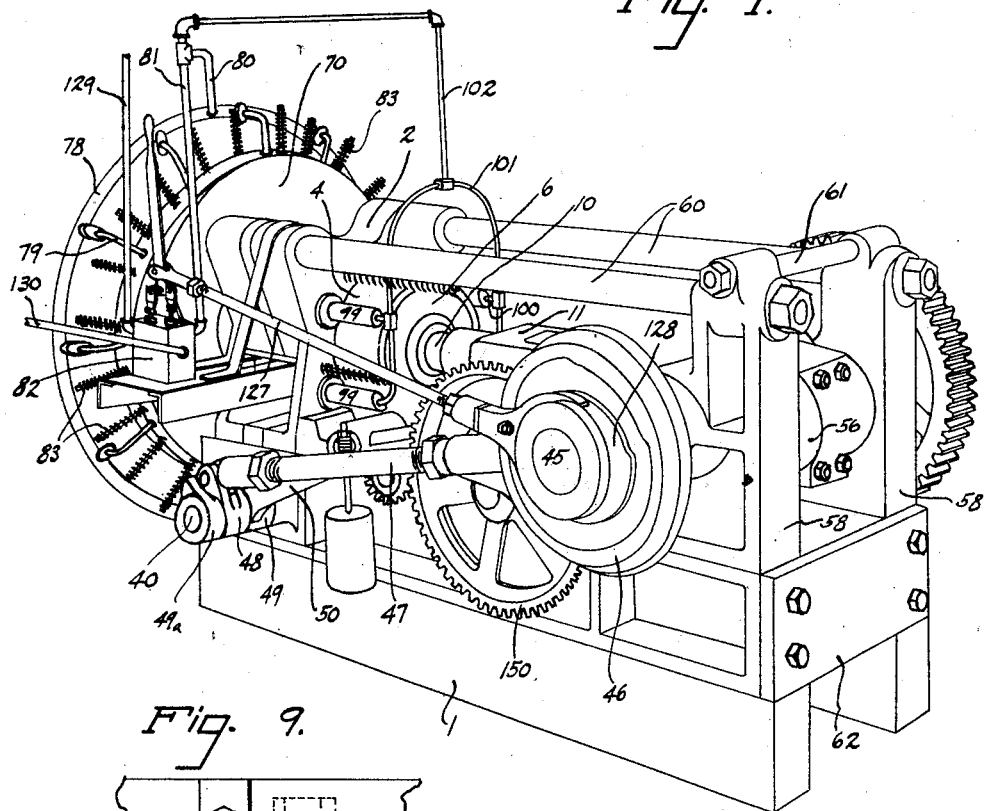
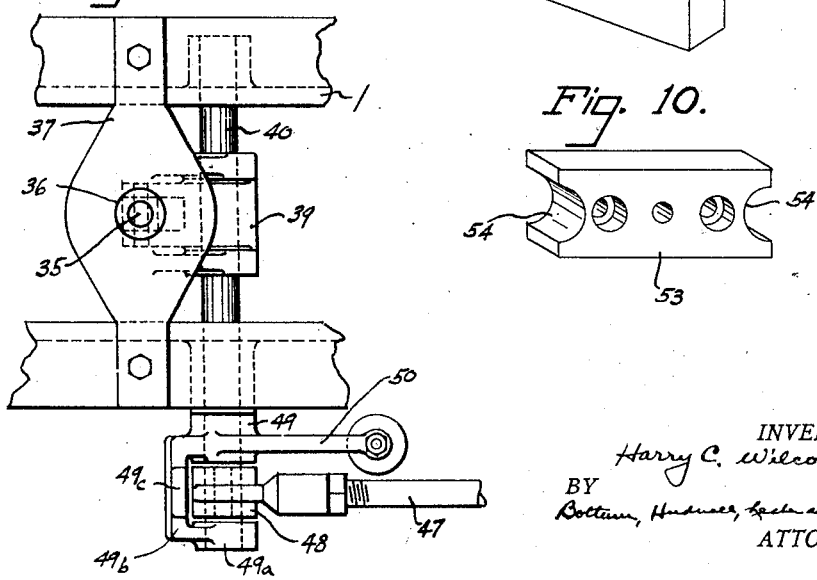
INVENTOR
Harry C. Wilcox
BY
ATTORNEY

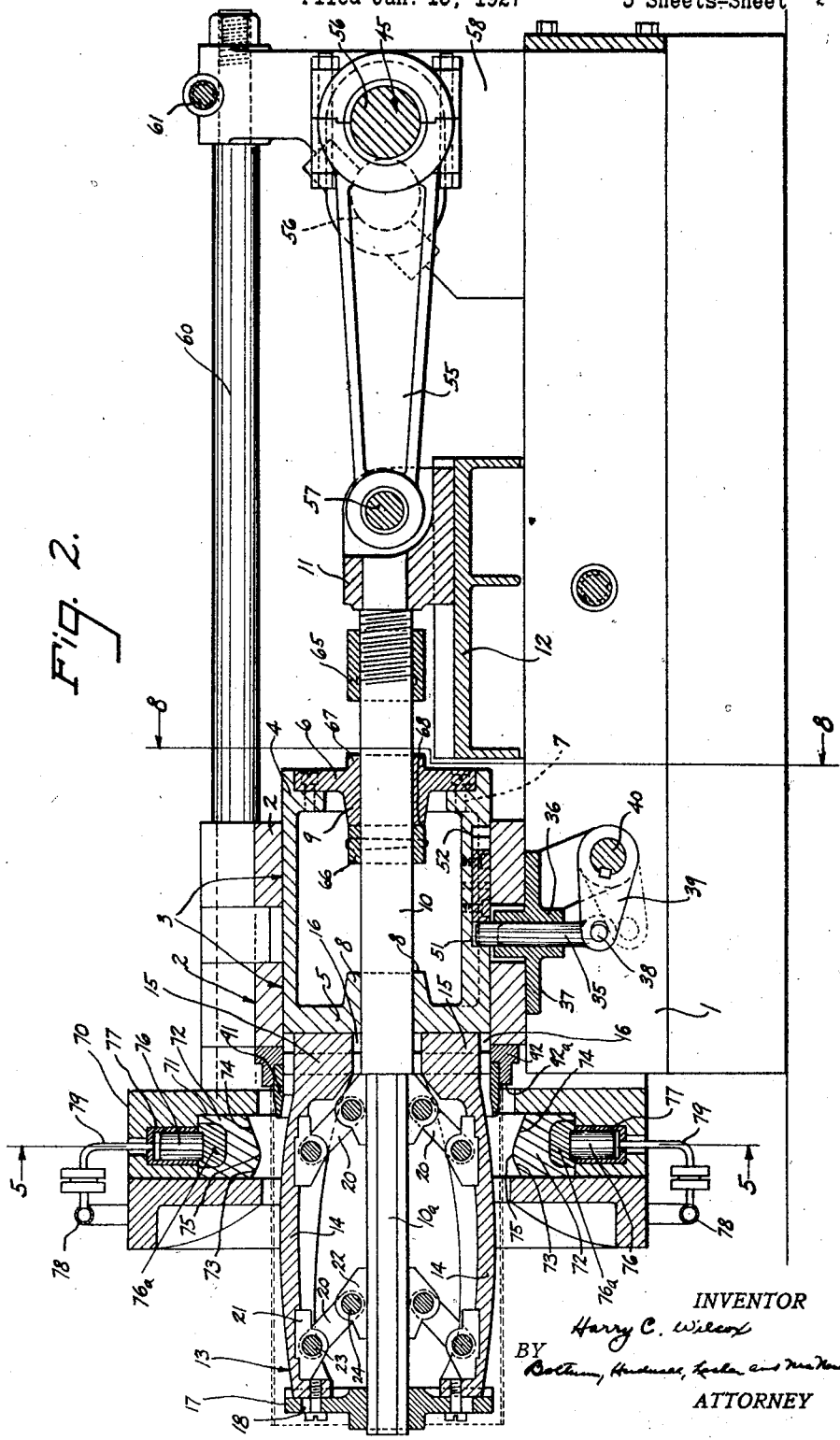

Oct. 30, 1928.
H. C. WILCOX
1,689,468
BARREL, METHOD OF AND MACHINE FOR MAKING THE SAME
Filed Jan. 13, 1927    5 Sheets-Sheet 3
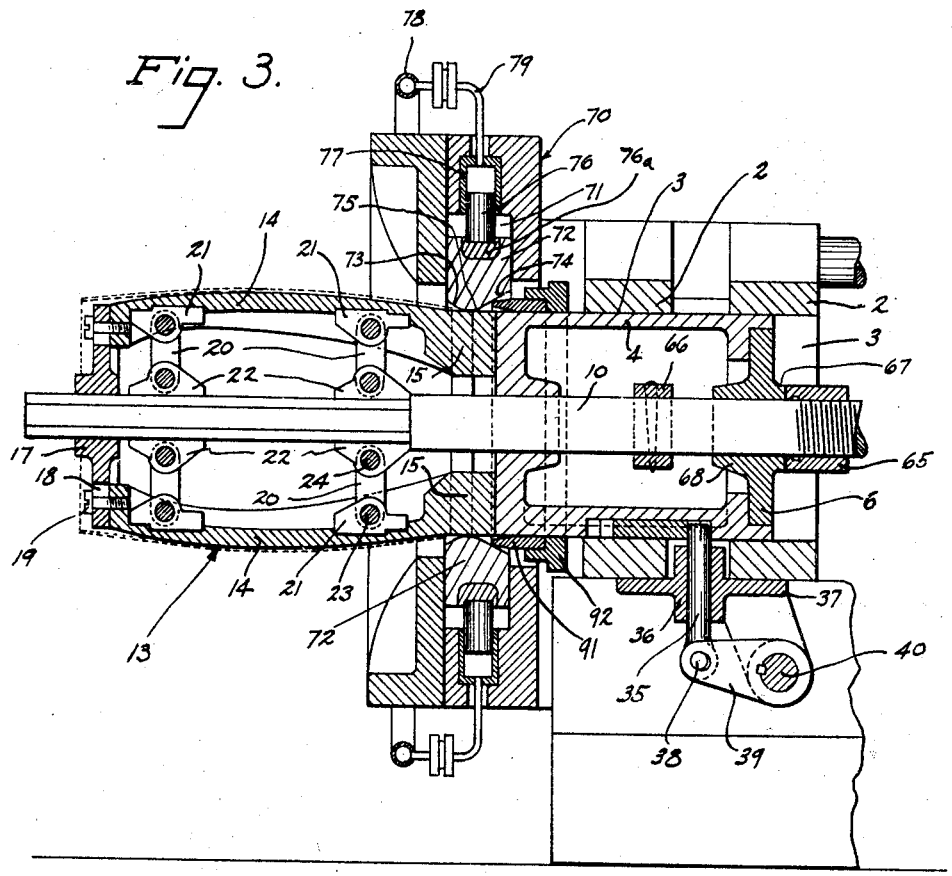
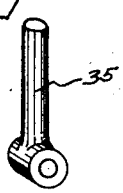
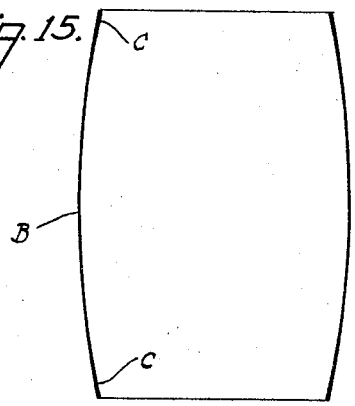
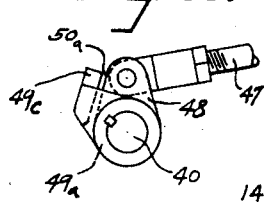
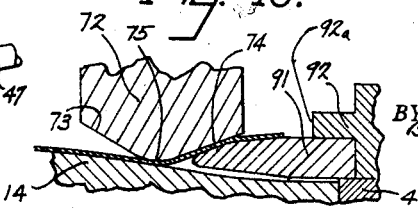
INVENTOR
Harry C. Wilcox
BY
ATTORNEY Oct. 30, 1928.
H. C. WILCOX
1,689,468
BARREL, METHOD OF AND MACHINE FOR MAKING THE SAME
Filed Jan. 13, 1927   5 Sheets-Sheet 4
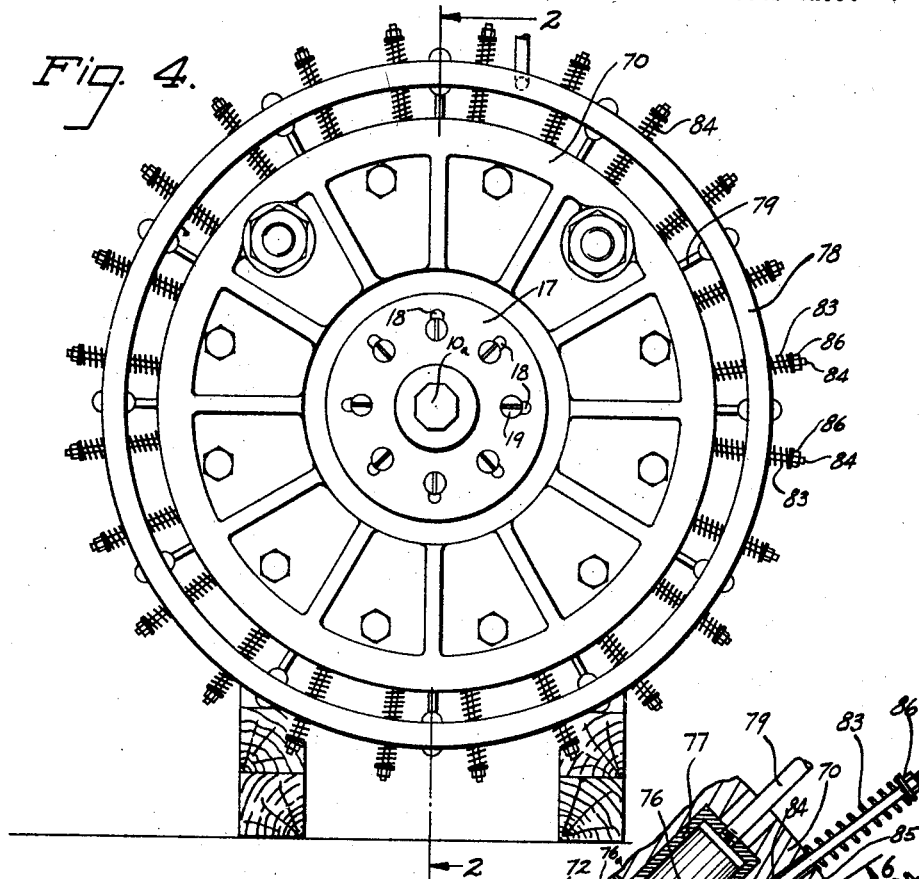
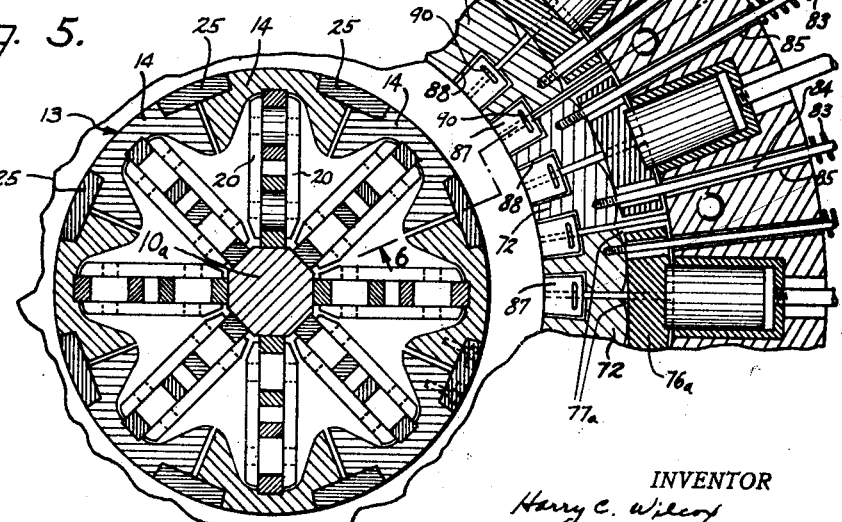
INVENTOR
Harry C. Wilcox
BY
ATTORNEY

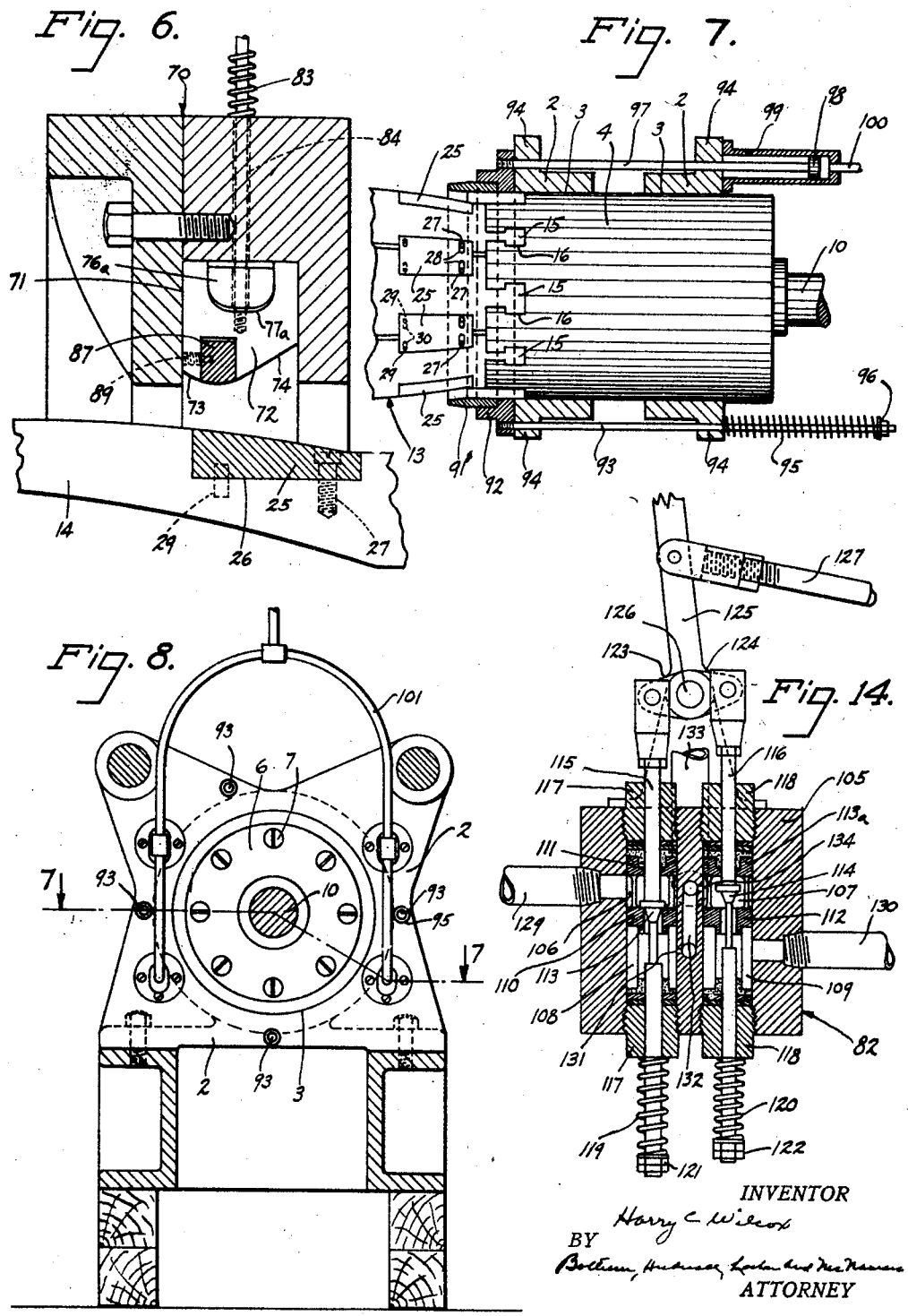

Patented Oct. 30, 1928.

1,689,468

UNITED STATES PATENT OFFICE.

HARRY C. WILCOX, OF WEST ALLIS, WISCONSIN, ASSIGNOR TO PRESSED STEEL TANK COMPANY, OF WEST ALLIS, WISCONSIN, A CORPORATION OF WISCONSIN.

BARREL, METHOD OF AND MACHINE FOR MAKING THE SAME.

Application filed January 13, 1927. Serial No. 160,828.

This invention relates to a method of and a machine for forming and shaping barrels and also relates to the novel barrel which is the product of the machine and method.

One object of the invention resides in the provision of a metal barrel or similar article formed from an open ended metal shell made up of a single piece of metal curved to have the form of a shell with its meeting edges united by a weld, braze or otherwise, and which while having this original structure possesses in its final form all of the characteristics of a barrel in that it is bilged at its center and reduced toward its ends. In addition, the barrel in its final form has a high degree of strength, stiffness and rigidity and has these desirable features as a result of its inherent structure and without the necessity of providing reinforcing ribs or other reinforcing means.

Another object is to provide a barrel or the like of this character and which is of simple and durable construction and easy and comparatively inexpensive to manufacture.

Another object is to provide a novel method of producing a barrel having these characteristics in that the barrel is produced by expanding the intermediate or central portion of an open ended metal shell of uniform diameter originally to a diameter greater than the original diameter of such portion and successively reducing the end portions of the shell to a diameter less than the original diameter of such end portions. The metal at the central portion of the shell is expanded without reducing its gauge, the ends of the shell being drawn in and the shell shortened in supplying the metal for the expansion of the central portion thereof and this together with the condensing and slight thickening of the metal at the end portions of the shell resulting from the reduction of the diameter of the end portions produces a marked increase in the strength and stiffness of the barrel. These advantages are had along with the advantage of producing the desirable bilge in the central portion of the barrel. The open ended shell employed is made up from a single piece of metal which is first rolled to cylindrical or tubular form and then has its meeting edges united by a longitudinal weld. The end portions of the shell in its final form are adapted to and are united with the heads of the barrel.

Another object of the invention resides in the provision of a novel machine for carrying out this method and producing a barrel having the characteristics mentioned and which is designed to shape and form the barrel without splitting, buckling or wrinkling and in an effective and expeditious manner. One of the novel features of the machine resides in its capacity to shape and form the barrel from an open ended shell and to automatically carry out the several operations involved in an effective and expeditious manner, the machine first expanding the central portion of the shell to bilge the same and hold the shell in position on the expanding means and then operating to iron down and condense the metal at one end of the shell to reduce the diameter of this end of the shell, after which the shell is reversed and the other end thereof is similarly upset and shaped.

Another object is to provide for the automatic movement of the dies employed to contract or iron down the ends of the shell, the dies not only being automatically and positively projected but being automatically and positively returned to inactive position.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 1 is a perspective view showing one embodiment of the machine employed for carrying out the method and producing the barrels;

Fig. 2 is a view of this machine partly in longitudinal central vertical section taken on line 2—2 of Fig. 4 and partly in side elevation;

Fig. 3 is a fragmentary view similar to Fig. 2 and illustrating the mandrel and associated parts in a different phase of the operation, parts of the machine being broken away for the sake of simplicity in illustration;

Fig. 4 is a view of the machine in front elevation;

Fig. 5 is a fragmentary sectional view taken on the plane of line 5—5 of Figure 2;

Fig. 6 is a fragmentary detail view taken on line 6—6 of Fig. 5;

Fig. 7 is a fragmentary detail view taken on line 7—7 of Fig. 8, parts being shown in elevation for the sake of illustration;

Fig. 8 is a view in transverse vertical section on line 8—8 of Fig. 2;

Fig. 9 is a fragmentary detail plan view of the locking mechanism;

Fig. 10 is a detail perspective view of the means providing the bolt seats on the cylindrical carrier;

Figures 11 and 12 are detail perspective views of parts of the locking mechanism;

Fig. 13 is a detail side elevation view of the operating means for the locking mechanism;

Fig. 14 is a detail view partly in section and partly in elevation showing the valve employed for regulating the flow of hydraulic pressure to the dies;

Fig. 15 is a view showing the barrel produced by the machine; and

Fig. 16 is a detail sectional view showing how the end portions of the shell are ironed down onto the mandrel.

Referring to the drawings, numeral 1 designates a suitable frame. At the forward end of the frame a number of guides 2 are provided, the guides 2 being bolted or otherwise securely fastened in position on the frame 1 and having alined guide openings 3 in which a cylinder designated generally at 4 is slidably fitted. As shown in Figures 2 and 3, the cylinder 4 has a front end plate 5 integral therewith and a rear end plate 6 fastened thereto by screws 7, as illustrated in Figure 8. The end plates 5 and 6 have alined bearings 8 and 9 coaxial with the cylinder 4 and through which a sliding shaft 10 is slidably fitted. The rearward end of the shaft 10 is fixed to a cross head 11 interfitted with a cross head guide 12. At this forward end the shaft 10 extends into an expansible and collapsible or contractible mandrel designated generally at 13 and having the same external shape or form when expanded as the barrel in its final form. The mandrel 13 is made up of a plurality of sections 14 of arcuate form in cross section and together constituting a cylinder in cross section. Each section 14 has a T-shaped extension 15 at its rear end, the T-shaped extension 15 being fitted for radial sliding movement in T-shaped slots 16 provided in the forward end of the cylinder 4. In this way the sections of the cylinder are constrained to partake of the axial movement of the cylinder 4, although free to move radially when expanding or when collapsing or contracting, the cylinder thus constituting a carrier for the mandrel. The mandrel also has a head plate 17 at its outer end, the head plate 17 being slidable on the outer end of the shaft 10 and being provided with radial slots 18 in which the shanks of headed screws 19 are slidably fitted, the heads of the screws overlapping the margins of the slots 18 and the inner ends of the screws being threaded into the sections of the mandrel. In this way the head plate of the mandrel coacts with the carrier or cylinder 4 to constrain the sections of the mandrel to radial sliding movement.

The mandrel is expanded and contracted by movement of the shaft 10 relative to the cylinder or carrier 4 through the instrumentality of toggle links 20. Two pairs of toggle links are provided for each section of the mandrel and as shown preferably eight mandrel sections are embodied in the mandrel structure. One pair of toggle links is positioned adjacent the forward end of its section and the other pair of toggle links is positioned adjacent the rearward end of its section. In the collapsed position of the mandrel the links incline forwardly, as shown in Figure 2, but in the expanded position of the mandrel these links extend radially, as shown in Figure 3. Each pair of links 20 has an attaching bracket 21 fixed to its section of the mandrel and an attaching bracket 22 fixed to the shaft 10. The links are pivotally connected to their brackets 21 and 22 by pivot pins 23 and 24. Any suitable fastening means may be employed for securing the brackets 21 and 22 to the sections of the mandrel and to the shaft 10 respectively, and as shown in Figures 2, 3, 4 and 5, the shaft 10 preferably has its forward portion $10^a$ of octagonal form in cross section so that the brackets 22 may be fastened to flat surfaces. The sections of the mandrel are formed with flat surfaces to receive the flat bases of their respective brackets 21. At this inner end the mandrel is provided with bridge blocks 25 which overlap the spaces between the adjacent sections of the mandrel, as clearly shown in Figure 7. The bridge blocks 25 are received in recesses 26 formed in the sections of the mandrel, as illustrated in Figures 5 and 6 and their outer surfaces are coincident with the outer surfaces of the sections of the mandrel. For the purpose of preventing displacement of the bridge blocks while leaving them free to such an extent as is necessary to permit the sections of the mandrel to expand and collapse or contract, stud bolts 27 are employed to secure the blocks to the mandrel sections, two bolts 27 being employed with each block, one of the bolts engaging one of the sections of the mandrel and the other bolt engaging the adjacent section of the mandrel. The bolts extend through countersunk slots provided in the bridge blocks, the slots having sufficient extent to provide the clearance necessary for expansion and collapse or contraction. Dowel pins 29 are also provided and are fastened in the sections of the mandrel, the dowel pins operating in slots 30 in the bridge blocks.

Means is provided for automatically locking or holding the cylinder or carrier 4 against movement in certain phases of the operation and this means comprises a vertical slidable lock bolt 35 mounted in a tubular guide 36 provided in a cross member 37 bolted to the frame as shown in Fig. 9. The bolt 35 has a pin and slot connection 38 with a crank arm 39 connected to a rock shaft 40 journaled in suitable bearings provided therefor in the frame 1 and on cross member 37. The shaft 40 is automatically rocked from the main shaft or crank shaft 45 of the machine through a suitable cam member 46 which reciprocates a rod 47 having it forward end pivotally connected to a collar 48 loosely fitted on the shaft 40 between spaced hubs 49 and 49$^a$ of a weighted arm 50, the hubs 49 and 49$^a$ being keyed to the shaft 40 and being connected together by an integral connecting portion 49$^b$ which spans the collar 48 to the front of the same. This arrangement merely facilitates the timing of the locking mechanism. As it is necessary to twice retract and twice project the locking bolt 35 in each cycle of the operation it is difficult to properly time the automatic action thereof. With the weighted arm 50 having its hubs 49 and 49$^a$ keyed to the shaft 40 the cam member 46 may be easily designed and shaped to swing the loose collar 48 rearwardly in advance of the phases in which the bolt 35 is to be projected into engagement with the seats 51 and 52 provided therefor in the cylinder 4. Such rearward swinging of the loose collar 48 swings its abutment portion 50$^a$ away from the cooperable shoulder 49$^c$ on the connecting portion 49$^b$ of the hubs of the arm 50 thereby permitting the weighted arm 50 to rotate the shaft 40 and cause the bolt 35 to drag on the cylinder 40 until one of the seats 51 or 52 comes into registration therewith whereupon the bolt 35 is projected into the registering seat by the action of the weighted arm. The cam 46 is timed to move the rod 47 forwardly to engage the abutment portion 50$^a$ with the cooperable shoulder 49$^c$ of the connecting portion 49$^b$ of the hubs of the weighted arms to positively rotate shaft 40 from the crank shaft 45 when the bolt 35 is to be retracted and disengaged from the seat 51 or 52 with which it has been interlocked. Such timing of the cam is an easy matter. Of course the cam 46 may be properly timed to effect all four bolt operations positively but the expedient described represents an easy and convenient way of accomplishing the same result.

The seats 51 and 52 are provided by recessing the cylinder and setting in the recesses a wear plate 53 having notches 54 and 54$^a$ in its ends which are complementary to portions of the recess of the cylinder to define the seats 51 and 52 and which present hard metal surfaces to take the wear and thrust.

When the cylinder or carrier 4 is locked and the shaft 10 advances, the toggle links 20 are swung to expand the mandrel, and similarly when the cylinder or carrier 4 is locked and the shaft 10 retracts, the toggle links 20 are reversely swung to collapse or contract the mandrel. The shaft 10 is advanced and retracted by means of a connecting rod 55 actuated from a crank 56 provided on the crank shaft 45 and pivotally connected as at 57 with the cross head 11. The crank shaft 45 is journaled in suitable bearings 58 provided therefor on the frame 1 and these bearings 58 are interconnected with the guides 2 by tie rods 60 whereby both the bearings and the guides are strengthened and stiffened and vibration is minimized. A cross rod 61 may also be provided between the bearings 58 at their upper ends while the lower ends of these bearings are connected by a cross plate 62.

For the purpose of moving the cylinder or carrier 4 axially from the shaft 10, spaced collars 65 and 66 are fixed on the shaft 10. The collar 65 in certain phases of the operation engages an abutment 67 presented by one end of the bearing 9 of the end plate 6 of the cylinder or carrier while the collar 66 engages an abutment 68 presented by the opposite end of this bearing 9 in other phases of the operation, as will be hereinafter more fully described.

At the forward end of the machine a two-part annular frame member 70 is provided, the frame member 70 being carried on and secured to extensions of the tie rods 60 and having its parts securely bolted or otherwise suitably fastened to each other and to the forward guide 2 and to the forward end of the frame 1. This frame member 70 has an annular die chamber 71 which extends around the entire inner circumference of the same and which opens out through the inner circumference. In this chamber 71 projectable and retractable dies 72 are slidably fitted for radial movement. There are twenty-four dies in the embodiment of the invention illustrated but of course this number may be varied. The inner ends of the dies are beveled off forwardly as indicated at 73 and rearwardly as indicated at 74 from the draw line or active surface 75 of the die. The dies are forced outwardly by hydraulic pressure means which may comprise one piston for every two dies, each piston being slidably fitted in a cylinder 77 set into a recess provided therefor in the frame member 70 inwardly of the chamber 71 and each piston having its inner end fitted in a notch provided therefor in a cross head or bridging member 76$^a$ spanning the two associated dies. As shown in Fig. 5, each cross head or bridging member 76$^a$ is received in grooves 77$^a$ formed in its associated dies and brazed on the crests of the curved inner walls of the grooves so as to impart only a direct inward thrust to the dies. All of the pistons and cylinders are supplied with fluid under pressure from a manifold 78 which encircles the frame 70 and which is connected with the cylinders 77 by means of branch pipes 79. The manifold 78 is supplied with fluid under pressure through a pipe 80 coupled with a fluid pressure supply line 81 in which a valve control means 82 is incorporated.

Each die 72 is biased to its retracted or inoperative position and automatically returned to such position upon release of the hydraulic pressure by means of a coil spring 83, encircling a rod 84 extending through an opening 85 in the frame member 70 and threaded into or otherwise suitably connected with its die 72. One end of each spring 83 abuts the frame member 70 and the opposite end of such spring abuts a nut and washer assembly 86 mounted on its rod 84. By adjusting the nut and washer assemblies 86 the tension of the springs 83 may be varied to secure the proper action.

In order to provide a continuous draw line or active surface on the dies 72, bridge blocks 87 are provided between adjacent dies, the bridge blocks overlapping the meeting surfaces of the dies and being received in recesses 88 formed in adjacent dies as shown in Fig. 5. The bridge blocks have the requisite freedom of movement and yet are held against displacement by means of pins 89 threadedly connected with the dies and engaging slightly elongated slots 90 provided in the bridge blocks as shown to advantage in Figures 5 and 6.

In conjunction with the dies 72 an annular die member or pressure ring 91 is employed and is mounted on and secured to an annular carrier or mounting frame 92 encircling and slidable relative to the cylinder 4 and supported for sliding movement relative to the cylinder 4 by supporting rods 93 slidably fitted in the openings of bearings 94 provided therefor on the guide members 2 as clearly shown in Figure 7. As shown in Figure 8, four such rods 93 are preferably provided. For the purpose of biasing the annular die member or pressure ring 91 to a retracted position, coil springs 95 encircle the portions of the rods 93 which project beyond the rear guide 2. These coil springs have their forward ends engaging the rearward guide 2 and have their rearward ends engaging the nut and washer assemblies 96 which are adjustably threaded on the rods 93 to secure the desired tension of the springs 95. The annular die member or pressure ring 91 is projected at the proper time by hydraulic pressure means including piston rods 97 threadedly connected with the carrier 92 as shown in Fig. 7 and carrying pistons 98 at their rearward ends, the pistons 98 being operatively fitted in cylinders 99 mounted on the rearward guide 2 and supplied with fluid under pressure by branch pipes 100 communicating with a manifold 101 and which is supplied with fluid under pressure by means of a pipe line 102 leading from the supply pipe 81.

The valve means 82 may be of any suitable type of construction adapted to be automatically controlled from the crank shaft 45 to cause projection of the dies 72 and the die 91 and to permit retraction of the same at the proper time in the cycle of the operation. For the sake of illustration one type of valve means that may be employed is shown in Figures 1 and 13. This valve means comprises a valve body 105 drilled and machined to provide internal chambers 106, 107, 108 and 109, the chamber 106 being separated from chamber 108 by a partition constituted by the lower member 110 of a valve cage 111, the chamber 107 being separated from the chamber 109 by a partition constituted by the lower member 112 of a valve cage designated at 113ª. The partitions 110 and 112 are ported and formed with the valve seats around their ports and with these valve seats valve members 113 and 114 coact. Valve members 113 and 114 are formed on guide stems 115 and 116, the guide stems 115 and 116 being slidably fitted in guide blocks 117 and 118, suitable stuffing box or packing being associated with each of the several guide blocks. The stems 115 and 116 project beyond the valve body and the lower projecting ends are encircled by coil springs 119 and 120 which engage nut and washer assemblies 121 and 122 on the guide stems 115 and 116 and which abut the lower blocks 117 and 118 to urge the valve stem downwardly and consequently urge the valves 113 and 114 against the seats provided around the ports of the members 110 and 112. The upper ends of the stems have suitable connection with the arms 123 and 124 of a rockable lever 125 fulcrumed as at 126 on the valve body. This lever 125 is pivotally connected to one end of a cam rod 127 which is moved back and forth under the influence of a cam 128 mounted on the shaft 45. As shown in Figure 14, a pipe line 129 leading from a suitable pump and accumulator or other suitable source of fluid pressure communicates with the chamber 106 and a fluid pressure exhaust pipe 130 communicates with the chamber 109. The chamber 108 communicates through a port 131 and a passage 132 with a passage 133 having open communication with the supply pipe 81. The chamber 107 also communicates with this passage 133 through a port 134. With this arrangement when the lever 125 is swung to open the valve 113 fluid under pressure flows into the chamber 106, past the valve 113, into the chamber 108, through the port 131 and passages 132 and 133 into the pipe 81 from whence it flows into the manifolds 78 and 101 through pipes 80 and 102. From the manifolds 101 and 78 the pressure freely flows into the cylinders 77 and 99 wherein it acts on the pistons 76 and 98 respectively to advance the dies 72 and 91. When the lever 125 is swung to the left as shown in Figure 14, then the valve 113 seats and the valve 114 opens. This cuts off the supply of fluid pressure since the fluid pressure can not get by the valve 113, but exhaust of fluid pressure is permitted since the valve 114 is opened to permit the fluid pressure to flow back from the supply pipe 81 through the passages 133 and 132, port 134, chamber 107, past the valve 114 and through chamber 109 into the exhaust pipe 130.

The machine is used to shape and form barrels or the like from open ended shells. Preferably the open ended shell is formed by rolling or otherwise suitably forming a piece of metal, such as steel, into a cylinder and uniting the meeting edges of the cylinder. This uniting of the edges of the cylinder is brought about preferably by welding these edges. The shell thus formed is of uniform diameter from end to end and in this form it is easily slipped over the collapsed mandrel 13, the mandrel 13 at this time being positioned as shown in Fig. 2 of the drawing. The inner end of the shell receives the die 91 and the peripheral edge of the shell abuts a shoulder 92ª presented adjacent the die 91 by the carrier 92. With the shell in this position on the mandrel 13 and die 91 the machine is started. The crank shaft 45 may be driven from any suitable source of power and in the present machine power is taken onto a pulley (not shown) and is transmitted through a clutch and suitable reduction gearing 150 to the crank shaft. When the crank shaft first begins to move it advances the connecting rod 55 and consequently advances shaft 10 through the cylinder 4. The cylinder 4 can not move at this time as it is locked against movement by the bolt 35. As the cylinder is locked the sections 14 of the mandrel are held against axial movement thereby, and as the shaft 10 moves axially and outwardly through the mandrel, the toggle links 20 are moved from the inclined position shown in Fig. 2 to the radial position shown in Fig. 3 thereby moving the sections 14 of the mandrel radially outwardly and expanding the central or intermediate portion of the shell. This expansion of the intermediate portion of the shell does not involve a stretching of the metal which results in thinning or weakening the same, but draws in the ends of the shell slightly to supply the metal needed for the expansion. After this expansion of the intermediate portion of the shell is accomplished the shell is bilged and is held on the mandrel by virtue of its bilge since it conforms in its longitudinal curvature to the longitudinal curvature of the mandrel. At this time the cam or eccentric arrangement 46 operates to move the rod 47 forwardly and swing the shaft 40 so as to draw the bolt 35 downwardly out of the seat 51 and unlock the cylinder. During the previous movement of the shaft 10 the collar 65 has been brought up to engage the shoulder 67 so that the subsequent movement imparted to the shaft 10 from the crank shaft 40 is transmitted to the cylinder 4 through the collar 65 and shoulder 67. At the same time the cam or eccentric arrangement 128 operates to shift the valve 82 to the position to supply pressure to the hydraulic means employed to project the dies 72 and 91. The dies 72 are thus forced in against the shell and tend to and do compress it against the mandrel while the mandrel moves outwardly with the cylinder 4 due to the coaction of the collar 65 with the shoulder 67. The die 91 follows the mandrel due to the action of hydraulic pressure on the piston 98 at this time. The inner end of the shell is in this way contracted and reduced to a diameter less than its original diameter and it is evenly and smoothly ironed down against the mandrel. This ironing action is had without any buckling or wrinkling even in the final phases of the operation, buckling or wrinkling being effectively prevented by the feature of drawing the metal at the inner end of the shell in between the dies 72 and the die 91 as shown in Fig. 16. When the inner end of the shell has been completely reduced and ironed down against the mandrel, the mandrel is advanced outwardly as far as it may be and at this time the cam 46 permits the weighted arm 50 to cause the bolt 35 to be projected upwardly into the seat 52 thereby locking the cylinder 4 in position. Simultaneously with this action the cam 128 operates to shift the valve 82 to permit of the exhaust of hydraulic pressure from the cylinders 77 and 98. As soon as the hydraulic pressure is permitted to exhaust from these cylinders the springs 83 and 95 automatically retract the dies 72 and 91. At this phase of the operation, the motion of the crank shaft is such as to move the shaft 10 rearwardly or to the right, as shown in Figures 2 and 3. This motion of the shaft 10 is not at this time imparted to the cylinder 4 as it moves the collar 65 away from its shoulder 67 and as the collar 66 is at this time in spaced relation to the shoulder 68. As a result of the holding of the cylinder 4 and of the movement of the shaft 10 to the right as viewed in Fig. 3, the toggles 20 are swung from the position shown in Fig. 3 to the position shown in Fig. 2 thereby drawing the sections 14 of the mandrel radially inwardly, thus collapsing the mandrel and leaving the shell loose thereon. As the movement of the crank shaft progresses the cam 46 again operates to withdraw the bolt 35 from the seat 52 and then the collar 66 engages the shoulder 68 so that further rearward movement of the shaft 10 draws the cylinder 4 rearwardly and pulls the mandrel 14 through the shell thus stripping the shell from the mandrel. This operation continues until the cylinder 4 is in the position shown in Fig. 2 when the cam again operates to permit projection of the bolt 35 into the seat 51 thus positioning all of the parts for a repetition of the operation just described. The shell is then reversed on the mandrel in order to effect the contraction and reduction of its other end. The operation involved in the reduction of this other end is the same as hereinbefore described, with the exception that the expansion of the mandrel does not effect any further expansion of the central portion of the shell but only brings about such engagement of the mandrel with the shell as to secure the shell on the mandrel. The inner end of the shell is, however, ironed down on the mandrel as before. In this way a barrel is produced which has its central portion expanded without being thinned or stretched and its end portions contracted or condensed. This has the advantage of providing a barrel which has high strength, stiffness and rigidity and yet is constructed of a sheet of metal formed into a shell and welded longitudinally. The ends of the shell are adapted to have heads brazed or otherwise suitably secured therein. In Fig. 15 such a barrel is shown at B and in this particular barrel shown the central portion of the barrel has an inside diameter of 24 inches when completed and an inside diameter of 20⅞ inches at the ends when completed. This structure is had from an open ended shell which at the start of the operation is of a uniform diameter of 22 inches from end to end. The result of this structure in the barrel is to strengthen and stiffen it and to give it additional capacity as well as to shape it as a barrel. Another very important advantage is that barrels produced in this way are produced without loss in that there is practically no splitting of the shells in the formation of the barrel. The metal at the ends of the shell is really upset between the dies 72 and 91 with the result that the ends of the barrel though smooth are slightly thickened and condensed, as indicated at C.

The invention claimed is:

1. The herein described method of making metal barrels which consists of expanding the central portion of an open ended metal shell beyond the original diameter thereof and reducing it at its end portions to less than the original diameter.

2. The herein described method of making metal barrels which consists of expanding beyond the original diameter the intermediate portion of an open ended metal shell of uniform diameter originally and then reducing it at the end portions thereof to a diameter less than that of the original diameter of the shell.

3. The herein described method of making metal barrels which consists in forming a sheet of metal into a cylinder, uniting the edges of the sheet to form an open ended shell of uniform diameter, expanding the intermediate portion of the shell and reducing the end portions thereof.

4. The herein described method of making metal barrels which consists in forming a sheet of metal into a cylinder, welding the edges of the sheet to form an open ended shell of uniform diameter, expanding the intermediate portion of the shell and reducing the end portions thereof.

5. The herein described method of making metal barrels which consists in expanding beyond its original diameter the intermediate portion of an open ended metal shell on an expansible mandrel and reducing the end portions of the shell by ironing the end portions down on the mandrel between dies.

6. The herein described method of making metal barrels which consists of expanding the intermediate portion of an open ended shell to a diameter greater than that of the original diameter of such portion of the shell, and then successively reducing the end portions of the shell.

7. The herein described method of making metal barrels which consists in expanding beyond its original diameter the central portion of an open ended shell on an expansible mandrel, reducing one end portion of the shell by ironing such end portion down onto the mandrel between dies and then reversing the position of the shell and repeating the reducing step for the other end portion.

8. A machine for forming and shaping barrels comprising an expansible mandrel adapted to receive a shell and to bilge the same when expanded, said mandrel being mounted to move axially, releasable means for holding the mandrel against axial movement, means for expanding the mandrel when it is held against axial movement, dies cooperable with the mandrel to reduce an end of the shell thereon when the mandrel moves axially and means for moving the mandrel axially when it is released.

9. A machine for forming and shaping barrels comprising an expansible mandrel adapted to receive an open ended shell and to expand the central portion thereof whereby to bilge the shell and hold the same on the mandrel, means for holding the mandrel against axial movement while leaving the same free to expand and contract, means for expanding the mandrel, and dies cooperable with the mandrel to reduce one end of the shell thereon upon relative axial movement of the mandrel and dies.

10. A machine for forming and shaping barrels from open ended shells comprising a slidable carrier, an expansible and collapsible mandrel adapted to receive a shell and connected with the carrier to be constrained to partake of the axial movement of the carrier while free to expand and contract, means for locking the carrier against movement during certain phases of the operation, means for axially moving the carrier and consequently the mandrel when the carrier is unlocked, means for expanding and collapsing the mandrel when the carrier is locked, and dies engaging the shell and ironing an end of the shell down onto the mandrel when the mandrel is moved axially outwardly.

11. A machine for forming and shaping barrels from open ended shells comprising a slidable carrier, an expansible and collapsible mandrel adapted to receive the shell and connected with the carrier to be constrained to partake of the axial movement of the carrier while free to expand and contract, means for locking the carrier against movement during certain phases of the operation including a locking bolt, said carrier having spaced seats with which the locking bolt coacts, and operating means actuated in synchronism with the machine for automatically moving said locking bolt, means for axially moving the carrier and consequently the mandrel when the carrier is unlocked, means for expanding and collapsing the mandrel when the carrier is locked, and dies engaging the shell and ironing an end of the shell down onto the mandrel when the mandrel is moved axially outwardly.

12. A machine for forming and shaping barrels comprising a frame, a carrier slidably mounted on the frame, a shaft slidably fitted through the carrier, an expansible and collapsible mandrel adapted to receive a shell to be formed into a barrel, said mandrel being connected with the carrier to be constrained to partake of the axial movement thereof while free to expand and contract, means for locking the carrier against movement during certain phases of the operation, means for expanding and collapsing the mandrel from the shaft when the carrier is locked, said mandrel bilging the shell when expanded, means for moving the carrier from the shaft when the carrier is unlocked and consequently moving the mandrel axially, and dies engaging the shell and ironing an end of the shell onto the mandrel when the mandrel is moved axially outwardly.

13. A machine for forming and shaping barrels comprising a slidable carrier, a shaft movable through the carrier, an expansible and collapsible mandrel connected with the carrier for axial movement therewith but free to move radially, releasable locking means cooperable with the carrier, means for expanding and collapsing the mandrel from the shaft when the carrier is locked, means for moving the carrier when it is unlocked and dies cooperable with the mandrel for reducing an end of the shell when the mandrel is moved.

14. A machine for forming and shaping barrels comprising a slidable carrier, a shaft movable through the carrier, an expansible and collapsible mandrel connected with the carrier for axial movement therewith but free to move radially, releasable locking means cooperable with the carrier, toggle links between the shaft and the mandrel for expanding and collapsing the mandrel when the shaft is moved and the carrier is held, means for moving the carrier when it is unlocked and dies cooperable with the mandrel for reducing an end of the shell when the mandrel is moved.

15. A machine for forming and shaping barrels comprising a slidable carrier, a shaft movable through the carrier, an expansible and collapsible mandrel connected with the carrier for axial movement therewith but free to move radially, releasable locking means cooperable with the carrier, means for expanding and collapsing the mandrel from the shaft when the carrier is locked, spaced means fixed on the shaft and engageable with the carrier for moving the carrier from the shaft when the carrier is unlocked whereby the mandrel is also moved axially, and dies cooperable with the mandrel for reducing an end of the shell when the mandrel is moved.

16. A machine for forming and shaping barrels comprising an expansible mandrel adapted to receive a shell and to bilge the same when expanded, releasable locking means for holding the mandrel against axial movement, means for expanding the mandrel when it is held against axial movement, dies cooperable with the mandrel to reduce an end of the shells therein when the mandrel moves axially, means for moving the mandrel axially when released by said locking means and hydraulic means operated in synchronism with the machine for projecting and retracing said dies.

17. A machine for forming and shaping barrels comprising an expansible and collapsible mandrel adapted to receive an open ended shell and expand the central portion thereof to slightly bilge the shell and hold the same on the mandrel, a series of dies surrounding the axis of the mandrel, hydraulic means for forcing the dies inwardly whereby the dies coact with the shell to reduce an end thereof as the mandrel moves therethrough and spring means for retracting the movable dies.

18. A machine for forming and shaping barrels comprising an expansible and collapsible mandrel adapted to receive an open ended shell and expand the central portion thereof to slightly bilge the shell and hold the same on the mandrel, a series of dies surrounding the axis of the mandrel, hydraulic means for forcing the dies inwardly whereby the dies coact with the shell to reduce an end thereof as the mandrel moves therethrough, spring means for retracting the movable dies, a die member surrounding the mandrel and projecting into one end of the shell and cooperable with the inwardly moving die members to prevent buckling and wrinkling of the shell as it is ironed down onto the mandrel, hydraulic means for projecting said die member into engagement with the radially movable dies and spring means for retracting the movable die member.

19. A machine for forming and shaping barrels comprising a slidable carrier, a shaft movable through the carrier, an expansible and collapsible mandrel connected with the carrier for axial movement therewith but free to move radially, releasable locking means cooperable with the carrier, means for expanding and collapsing the mandrel when the shaft is moved and the carrier is locked, means for moving the carrier and mandrel axially when the carrier is unlocked, dies cooperable with the mandrel and engaging the shell for reducing an end of the shell when the mandrel is moved axially, spring means for retracting the dies, hydraulic means for projecting the dies into cooperative relation with the mandrel and shell, valve means controlling the supply of fluid pressure to said dies and operating mechanism for automatically opening and closing the valve means to regulate the supply and exhaust of hydraulic fluid to and from the dies in synchronism with the movements of the machine.

20. A machine for forming and shaping barrels comprising a frame, a carrier slidably mounted on the frame, a slidable shaft movable through the carrier, an expansible and collapsible mandrel adapted to receive a shell to be formed into a barrel, interengaging means between the mandrel and the carrier to constrain the mandrel to partake of the axial movement of the carrier while leaving the mandrel free to expand and contract, releasable locking means for securing the carrier against movement, means for expanding and collapsing the mandrel from said shaft when said shaft is moved and the carrier is held, means for moving the carrier from the shaft when the carrier is unlocked, dies cooperable with the mandrel and shell for ironing down an end of the shell when the mandrel moves, spring means for retracting the dies, hydraulic pressure means for moving the dies to active position, a rotatable shaft, means for moving the sliding shaft from the rotatable shaft, means for operating the releasable locking means in synchronism with the movement of the rotatable shaft, valve means controlling the supply and exhaust of the fluid pressure to the hydraulic pressure means and means for automatically operating the valve means from the rotatable shaft.

21. A machine for forming and shaping barrels comprising an expansible mandrel, a carrier connected with the mandrel to constrain the mandrel to partake of the axial movement thereof while leaving the mandrel free to expand and contract, releasable locking means for the carrier and operating mechanism for the locking means including a shaft connected therewith, a collar loosely fitted on the shaft, a cam operated member connected with the collar and a weighted member keyed to the shaft and with which the collar is engageable.

22. A machine for forming and shaping barrels comprising an expansible mandrel, a carrier connected with the mandrel to constrain the mandrel to partake of the axial movement thereof while leaving the mandrel free to expand and contract, and releasable locking means for the carrier including a locking bolt, said carrier having spaced seats with which the locking bolt coacts.

23. A machine for forming and shaping barrels comprising an expansible mandrel, a carrier connected with the mandrel to constrain the mandrel to partake of the axial movement thereof while leaving the mandrel free to expand and contract, releasable locking means for the carrier including a locking bolt, said carrier having a recess and a notched wear plate secured in the recess and affording spaced seats for the bolt.

24. A machine for forming and shaping barrels comprising an expansible and collapsible mandrel adapted to receive an open ended shell and expand the central portion thereof to slightly bilge the shell and hold the same on the mandrel, a series of dies surrounding the axis of the mandrel, hydraulic means for forcing the dies inwardly whereby the dies coact with the shell to reduce the end thereof as the mandrel moves therethrough and spring means for retracting the movable dies including a pair of rods connected with each die and a coil spring coacting with each rod.

25. A machine for forming and shaping barrels comprising a mandrel adapted to receive an open ended shell, a frame surrounding the mandrel and having a die chamber opening inwardly therethrough, a series of dies surrounding the mandrel and slidably fitted in said die chamber, hydraulic means for forcing the dies inwardly to coact with the mandrel and shell and means for automatically retracting the dies.

26. A machine for forming and shaping barrels comprising a mandrel adapted to receive an open ended shell, a frame surrounding the mandrel and having a die chamber opening inwardly therethrough, a series of dies surrounding the mandrel and slidably fitted in said die chamber, a piston connected to each die centrally thereof, a cylinder in the frame for each piston, each piston being slidably fitted in its cylinder, rods connected to the dies on the opposite sides of the piston thereof, said frame having openings through which the rods extend and springs coacting with the rods for automatically retracting the dies.

27. A machine for forming and shaping barrels comprising a mandrel adapted to receive a shell to be formed into a barrel, dies surrounding the mandrel and cooperable with the mandrel and with the shell, an annular die member receiving the end of the shell and coacting with the dies in ironing down the ends of the shell while preventing buckling and wrinkling, means for slidably supporting said annular die member, hydraulic means for advancing said annular member with the shell and spring means for retracting the annular die member.

28. A machine for forming and shaping barrels comprising a mandrel adapted to receive a shell to be formed into a barrel, dies surrounding the mandrel and cooperable with the mandrel and with the shell, an annular die member receiving the end of the shell and coacting with the dies in ironing down the ends of the shell while preventing buckling and wrinkling, means for slidably supporting said annular die member, hydraulic means for advancing said annular member with the shell and spring means for retracting the annular die member, said annular die member engaging the dies when at the limit of its outer movement.

29. A machine for forming and shaping barrels comprising a slidable carrier having radially extending T-shaped slots in its forward end, a mandrel made up of a plurality of sections, each section having a T-shaped extension fitted in a T-shaped slot on the carrier, a shaft extending through the mandrel, a head plate constrained to sliding movement on the shaft and means coacting with the sections of the mandrel and the head plate for constraining the sections of the mandrel to radially sliding movement.

30. A machine for forming and shaping barrels comprising a slidable carrier having radially extending T-shaped slots in its forward end, a mandrel made up of a plurality of sections, each section having a T-shaped extension fitted in a T-shaped slot on the carrier, a shaft extending through the mandrel, a head plate constrained to sliding movement on the shaft, means coacting with the sections of the mandrel and the head plate for constraining the sections of the mandrel to radially sliding movement and toggle links pivotally connected to the sections of the mandrel and to the shaft for expanding and collapsing the mandrel when the shaft is moved and the carrier is held.

31. A machine for forming and shaping barrels comprising a slidable carrier, a shaft movable through the carrier, an expansible and collapsible mandrel around the forward end of the shaft, means interconnecting the mandrel and the carrier whereby the mandrel is constrained to move axially with the carrier while free to expand and collapse, releasable means for locking the carrier against movement, means for expanding and collapsing the mandrel when the carrier is locked and the shaft is moved and means for moving the carrier from the shaft in certain phases of the operation and including spaced collars fixed to the shaft, said carrier having spaced shoulders with which the collars successively engage.

32. The herein described method of making metal barrels from open ended shells which consists in holding an intermediate portion of the shell on a mandrel having substantially the final shape of the barrel while leaving the end portions of the shell substantially free, then ironing down one end of the shell against the mandrel by the use of a cooperating die arrangement whereby the metal is worked from an intermediate point toward one end of the shell, then reversing the shell on the mandrel and similarly ironing down the other end thereof by working the metal from an intermediate point toward the other end.

33. The herein described method of making metal barrels from open ended shells which consists in holding an intermediate portion of the shell while leaving the end portions free and then contracting both end portions by working the metal from points intermediate the ends of the shell toward the ends thereof.

34. In the art of making metal barrels from open ended shells the step which consists in ironing down and contracting both ends of the shell by beginning at intermediate points and progressing toward the ends of the shell.

35. The herein described method of making metal barrels from open ended shells which consists in holding the shell on an expanded mandrel having, when expanded, substantially the final shape of the barrel and successively working the metal of the ends of the shell from intermediate points toward the ends of the shell to contract the ends.

36. A machine for making metal barrels from open ended shells, comprising a mandrel adapted to be expanded and contracted and having, when expanded, substantially the final shape of the barrel and operating to expand the central portion of the shell to give it a bilged shape and hold it on the mandrel, the end portions of the mandrel leaving the end portions of the shell free, a die arrangement surrounding the mandrel and located around an intermediate portion thereof at the beginning of the operation, means for expanding and collapsing the mandrel and for moving the mandrel axially when expanded and means for forcing the dies inwardly to engage an intermediate portion of the shell on the mandrel whereby as the mandrel and shell move axially the shell will be ironed down against the mandrel beginning at a point in between the ends of the shell and terminating at an end of the shell.

37. The hereindescribed method of making metal barrels which consists in subjecting the intermediate portion only of a shell to an internal expanding force to bilge the barrel and leaving the end portions of the shell free throughout the entire expanding action whereby said shell shortens longitudinally during such action and reduction in the thickness of the metal of the shell is avoided.

In witness whereof, I hereto affix my signature.

HARRY C. WILCOX.